May 14, 1957  L. R. RISSLER  2,791,808
MULTIPLE DOOR STRUCTURE
Filed May 14, 1952  9 Sheets-Sheet 1

WITNESSES:
Robert C. Baird
Leon M. Garman

INVENTOR
Lennius R. Rissler.
BY C. L. Freedman
ATTORNEY

May 14, 1957    L. R. RISSLER    2,791,808
MULTIPLE DOOR STRUCTURE
Filed May 14, 1952    9 Sheets-Sheet 2

WITNESSES:
Robert C. Baird
Leon M. Garman

INVENTOR
Lennius R. Rissler.
BY C. L. Freedman
ATTORNEY

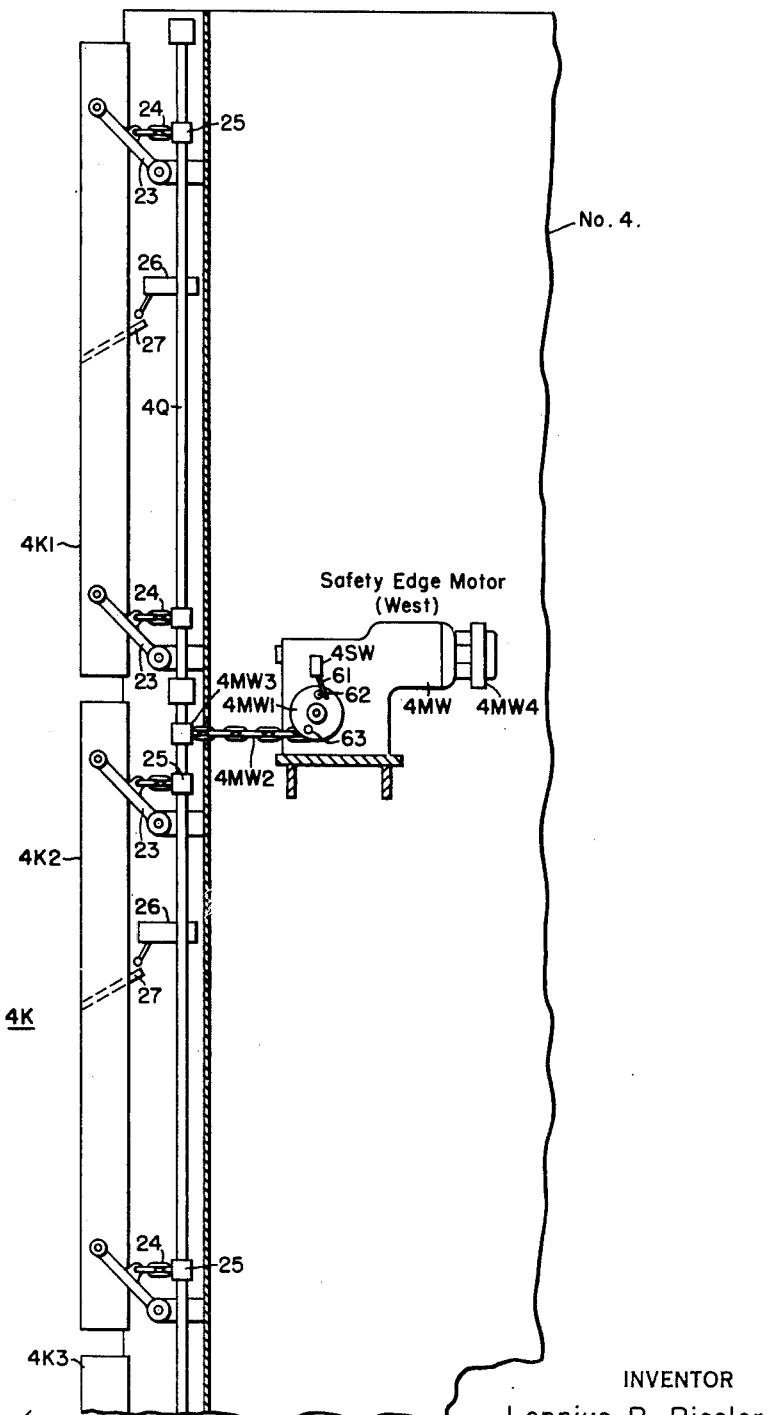

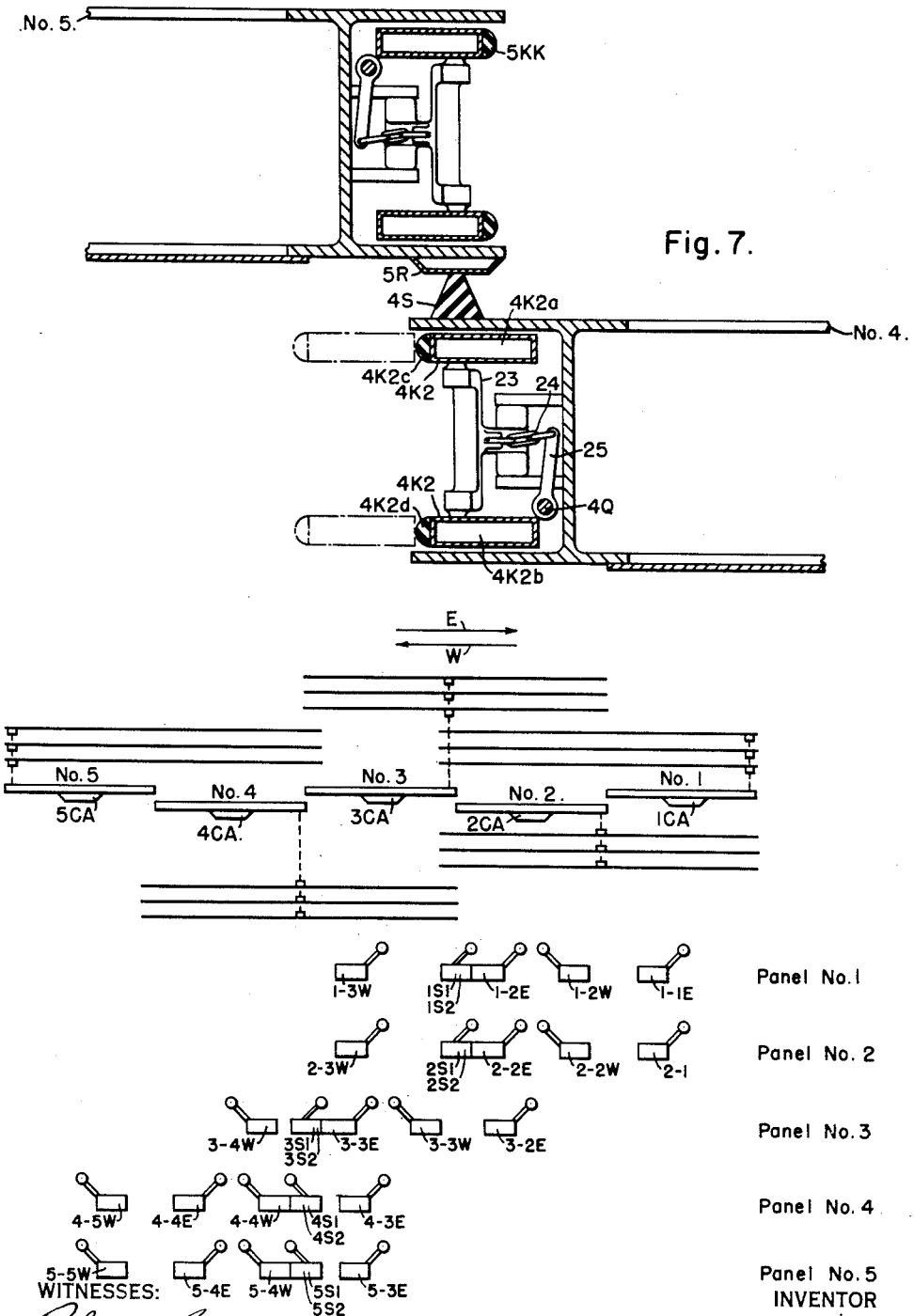

Fig. II.

United States Patent Office 2,791,808
Patented May 14, 1957

2,791,808
MULTIPLE DOOR STRUCTURE

Lennius R. Rissler, Hohokus, N. J., assignor to Westinghouse Electric Corporation, East Pittsburgh, Pa., a corporation of Pennsylvania Application May 14, 1952, Serial No. 287,720

8 Claims. (Cl. 20—19)

This invention relates to multiple door structures, and it has particular relation to structures having long uninterrupted door openings which are closed by a plurality of door units.

Many structures are provided with long door openings which are to be closed by door units. These door openings are intended to receive at various positions objects to be placed within the structure. Although the structure may be designed to receive objects of various types, the invention may be described adequately with reference to a building structure intended to receive aircraft.

In accordance with the invention, a building structure such as an aircraft hangar is provided with a door opening which may extend uninterruptedly over a complete side of the hangar. In order to close the opening, a plurality of rows of door units is provided. The rows of door units are adjacent each other and parallel but are spaced sufficiently to permit a door unit in one row to be moved alongside or, in some cases, past a door unit of an adjacent row.

The number of door units in each of the rows is insufficient to provide a complete closure of the door opening. The number of door units in each of the rows is selected to leave a row opening sufficient to receive or pass the largest object intended to be moved into or out of the hangar.

The number of rows of door units provided is sufficient to provide a total number of door units capable of providing a complete closure for the door opening. The door units in the various rows may be moved to different positions for the purpose of aligning the row openings at various positions in the door opening. Consequently, by proper manipulation of the door units, the aligned row openings permit entry or departure of any desired object relative to the hangar at any desired position in the door opening.

If the door units all have widths equal to the width of a row opening, it follows that a resultant opening may be provided at various positions equal in width to the row opening. However, if the door units have widths equal to a fraction of the row opening, the resultant opening provided may be equal in width to the row opening or equal to a door width as desired.

Each door unit preferably is movable in either direction along its row. Although each door unit may be manually moved by the application of an external force, preferably motive means for moving each door unit is mounted directly on the door unit. The motive means may be controlled from a control station carried by the door unit, or it may be controlled from a remote control station for the purpose of aligning the row openings at various positions or for the purpose of completely closing the door opening.

Each of the door units preferably is provided with object-detecting means. Such object-detecting means is responsive to the presence of an object in the path of movement of the door unit to initiate a stopping operation of the door unit. Object-detecting means may be provided at each end of each of the doors. Because of the heights of the door units employed for some building structures, the object-detecting means at each of the ends may be sectionalized, each of the sections being affected independently for initiating a stopping operation of a door unit. In a preferred embodiment of the invention, the object-detecting means is held in an ineffective or retracted condition when it is not required. When an object-detecting means is to be placed in service, it may be placed in an effective or advanced condition.

In order to prevent interference between door units, movement of the door unit may be restricted to certain predetermined areas.

It is, therefore, an object of the invention to provide a structure having an improved multiple door closure.

It is a second object of the invention to provide a structure having a door opening closed by a plurality of parallel rows of door units, each row having an over-all width of door units insufficient to close the door opening and thereby providing a row opening, the door units being movable within the door opening to align the row openings at various positions in the door opening.

It is a third object of the invention to provide a structure as defined in the preceding paragraph wherein each of the door units has independent motive means.

It is a fourth object of the invention to provide a structure as defined in either of the preceding two paragraphs in combination with remote control means for operating the door units to various positions.

It is a fifth object of the invention to provide a door unit reciprocable in either of two directions from a closed position.

It is a sixth object of the invention to provide a door unit having improved obstacle-detecting means.

It is a seventh object of the invention to provide a door unit having obstacle-detecting means at each end thereof.

It is an eightth object of the invention to provide a door unit having sectionalized obstacle-detecting means at an end thereof.

It is a ninth object of the invention to provide a door unit as defined in either of the preceding two paragraphs wherein the obstacle-detecting means is operable between an effective and an ineffective condition.

Other objects of the invention will be apparent from the following description taken in conjunction with the accompanying drawings in which:

Figure 6 is a detail view in sectional elevation showing obstacle-detecting means associated with a door unit;

Figure 7 is a view in cross section, with parts broken away, showing overlapping ends of two of the door units employed in the embodiment of Figure 1;

Figure 8 is a schematic view showing trolley conductors, limit switches, and direction switches employed in controlling the door units of Figure 1;

Figure 1:
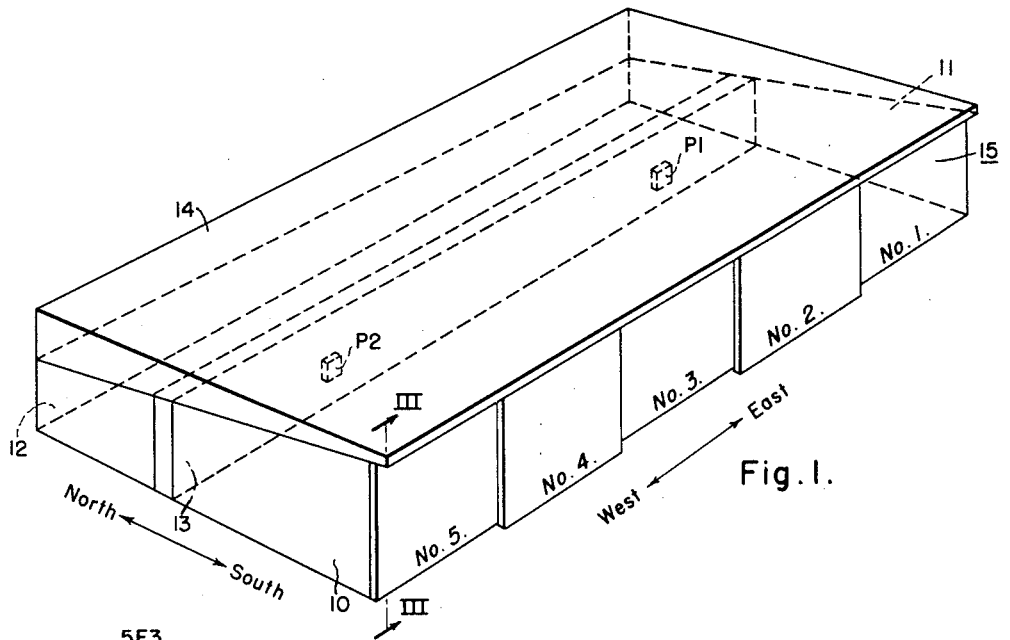
Figure 1 is a view in perspective of a structure embodying the invention.

Referring to the drawings, Figure 1 shows a building structure which may be employed for various purposes. It will be assumed that the building structure is employed for receiving objects such as aircraft, and it will be referred to hereafter as a hangar. Although the hangar may be oriented in any desired manner, it will be assumed that the end walls 10 and 11 are in vertical planes extending north and south, whereas the door units associated with the hangar are substantially in a vertical plane extending east and west. The compass directions are indicated by arrows in Figure 1.

The hangar of Figure 1 includes a rear wall 12 which connects the ends of the side walls 10 and 11. A partition 13 extends parallel to the rear wall 12 and divides the hangar into a front storage space and a rear service space. The space located between the partition 13 and the rear wall 12 may be occupied by machine shops, offices, or other suitable services.

The roof 14 of the structure is of cantilever construction and is supported entirely by the portion of the structure located between the rear wall 12 and the partition 13. The front of the roof projects south of the partition 13 to provide a continuous storage space which is provided with a continuous door opening 15.

The door opening 15 is closed by a plurality of rows of door units. The rows are spaced sufficiently to permit a door unit of one row to move alongside or, in some cases, pass a door unit of an adjacent row. The door units in each row are insufficient in themselves to close completely the door opening. However, sufficient rows are provided to permit complete closure of the door opening.

In the preferred embodiment of the invention illustrated in Figure 1, the door units are mounted in two rows. A first row includes three door units No. 1, No. 3 and No. 5. The second row includes door units No. 2 and No. 4. The door units in Figure 1 are illustrated in their closed positions wherein they completely close the door opening 15. The door units are mounted for independent reciprocation in east and west directions.

The arrangement of the door units illustrated in Figure 1 is unusually flexible and facilitates subsequent expansion of the hangar. For example, let it be assumed that initially the hangar is constructed having a door width sufficient to receive only the door units No. 1, No. 2, and No. 3. Under such circumstances, an opening equal in width to one of the door units may be provided at various positions in the door opening. For example, by moving the door unit No. 2 alongside the door unit No. 1 or the door unit No. 3, an opening normally closed by the door unit No. 2 is exposed to permit movement therethrough of any desired object. Alternatively, if the doors occupy the positions illustrated in Figure 1, the door unit No. 3 may be moved alongside the door unit No. 2 to expose the opening normally closed by the door unit No. 3. Again, if the doors occupy the positions illustrated in Figure 1, the door unit No. 1 may be moved alongside the door unit No. 2 to expose the opening normally closed by the door unit No. 1.

Let it be assumed next that the hangar is to be increased in size by a dimension corresponding to one door width. Under such circumstances, the west wall 10 may be moved west sufficiently to accommodate a fourth door unit No. 4, which is mounted in the same row as the door unit No. 2. It will be understood that the roof and rear wall 12 are suitably extended and that any tracks required for the doors also are extended.

The assumed hangar now contains door units Nos. 1, 2, 3 and 4. These door units may be manipulated substantially in the manner previously described to provide an opening substantially equal to the width of one of the doors at various desired positions in the door opening. However, the door units additionally may be manipulated to provide an opening equal substantially to twice the width of one of the door units at various desired positions.

As an example, let it be assumed that the door unit No. 2 is moved alongside the door unit No. 1 and that the door unit No. 3 is moved alongside the door unit No. 4. Under such circumstances, an opening normally closed by the door units No. 2 and No. 3 is exposed for passage into or out of the storage space of any desired object.

If the door units occupy the positions illustrated in Figure 1, the door unit No. 2 may be moved alongside the door unit No. 1, and the door units No. 3 and No. 4 may be moved respectively adjacent the door units No. 1 and No. 2 to provide an opening in the positions normally closed by the door units No. 3 and No. 4.

By moving the door units to their extreme positions in the west direction, an opening may be provided having a position normally closed by the door units No. 1 and No. 2.

Let it be assumed next that the hangar is to be further extended by a dimension equal to a door width. The west wall 10 may be moved west sufficiently to receive the door unit No. 5, which is mounted in the row containing the door units No. 1 and No. 3. It will be understood that the roof, the rear wall, the partition and any tracks required, are correspondingly extended. The hangar now is constructed as shown in Figure 1.

By inspection of Figure 1, it will be noted that any one of the door units may be moved to expose an opening normally closed by the door unit. In addition, the door units may be moved to expose an opening equal substantially to twice the width of a door unit at various positions in the door opening. For example, if the door unit No. 4 is moved alongside the door unit No. 5 and if the door unit No. 3 is moved alongside the door unit No. 2, an opening is exposed which normally is closed by the door units No. 3 and No. 4. On the other hand, if the door unit No. 3 is moved adjacent the door unit No. 1, if the door unit No. 5 is then moved adjacent door unit No. 3, and if the door unit No. 4 is moved adjacent the door unit No. 2, an opening is exposed which normally is closed by the door units No. 4 and No. 5. Other locations of the door openings may be obtained by suitable manipulations of the door units. It is believed that such manipulations will be understood from the foregoing examples.

From the foregoing discussion, it is clear that the door units always remain within the door opening 15. For this reason, no protective enclosure is required extending beyond the main outlines of the hangar. Furthermore, tracks, if required, need not extend beyond the hangar.

Despite the fact that the opening may be provided at various positions, a substantial portion of the door opening may be retained closed at all times. For example, if the maximum object to be moved through the door opening 15 has a width less than 160 feet, each of the door units may have a width of the order of 80 feet. It follows that an opening having a width of 160 feet may be provided at any of four positions in the door opening 15, the remaining portion of the door opening being maintained closed. At the same time, if an object having a width less than 80 feet is to be passed through the door opening, only one of the door units need be moved to provide an opening having a width of not more than 80 feet.

Although each of the door units may be manually moved, preferably they are controlled from one or more remote control stations. To this end, two control stations P1 and P2 are illustrated on the partition 13. These control stations will be described below.

Figure 2:
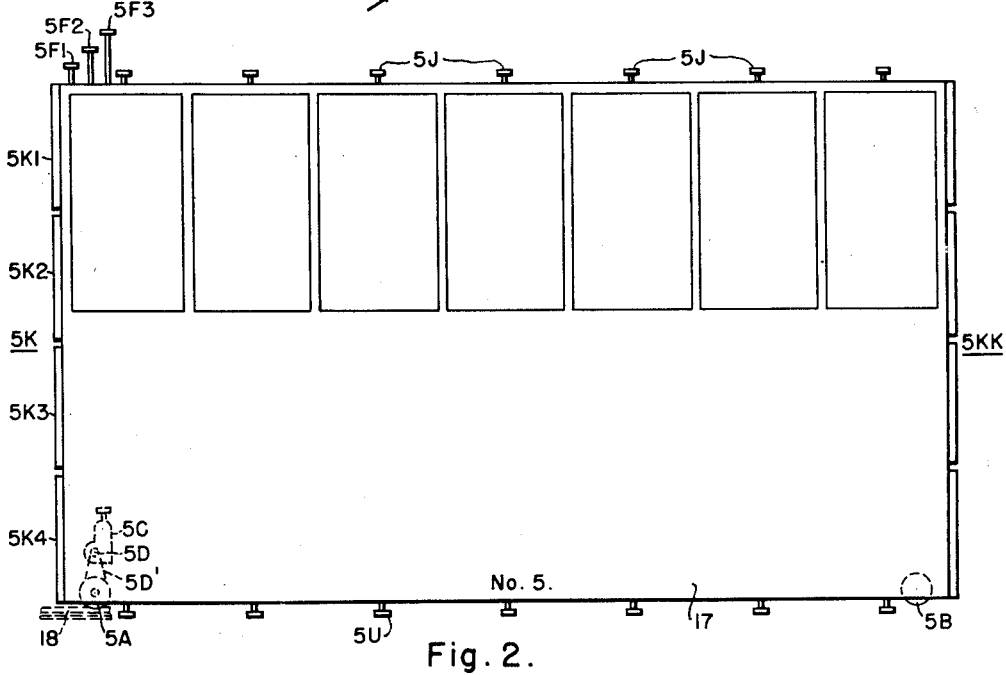
Figure 2 is a view in elevation of a door unit embodying the invention.

A suitable construction for each of the door units is illustrated in Figure 2 for the door unit No. 5. The door unit No. 5 comprises a panel 17 which may be constructed in any desired manner. This panel is mounted for horizontal reciprocation on two or more wheels. Wheels 5A and 5B are illustrated for this purpose in Figure 2 and are mounted adjacent the ends of the door unit. These wheels are mounted for rotation about axes transverse to the plane of the door unit and may be of flanged construction for operation on a suitable rail 18.

Although the door unit No. 5 may be manually reciprocated along its track, preferably a motive unit is provided for this purpose. For example, the wheel 5A may be a traction wheel which is coupled in any suitable manner to an engine 5C. The engine may be completely mounted on the door unit and may take the form, for example, of an internal combustion engine. However, in a preferred embodiment of the invention, the engine 5C comprises an alternating current or direct current electric motor which is coupled through suitable speed-reducing gears to a sprocket wheel 5D. The sprocket wheel 5D is coupled by means of a chain 5D' to a sprocket wheel (not shown) secured to the traction wheel 5A.

Suitable energy for mechanism mounted on the door unit may be obtained through a suitable number of trolley brushes represented by three trolley brushes 5F1, 5F2, and 5F3, which are secured in any suitable manner to the door unit but which are insulated from each other. If desired, the track 18 may be employed as a ground return in an electrical circuit supplying electrical energy to equipment mounted on the door unit.

In order to absorb wind loadings, a number of wind reaction rollers 5J may be positioned at spaced intervals along the upper edge of the door unit. Each of the rollers is mounted for rotation about a vertical axis. If desired, similar rollers may be mounted on the lower edge of the door unit for the same purpose.

Preferably, suitable object detecting means 5K and 5KK are provided at each end of the door unit. The object-detecting means is responsive to the presence of an object in the path of movement of the door unit to stop movement of the door unit. Preferably, such detection occurs in time to stop the door unit before the main panel 17 strikes the object.

In one form the object-detecting means takes the form of a safety edge which is biased away from the panel 17. Because of the extreme height of door units which may be encountered, the object-detecting means may be sectionalized. For example, the object-detecting means 5K has sections 5K1, 5K2, 5K3, and 5K4. Each of the sections is independently effective in response to the presence of an object in the path of movement thereof for stopping further movement of the door unit. Although the object-detecting means in Figure 2 are illustrated in advanced positions, they may be operated to ineffective or retracted positions when they are not required. Mechanism for this purpose will be described below.

Figure 3:
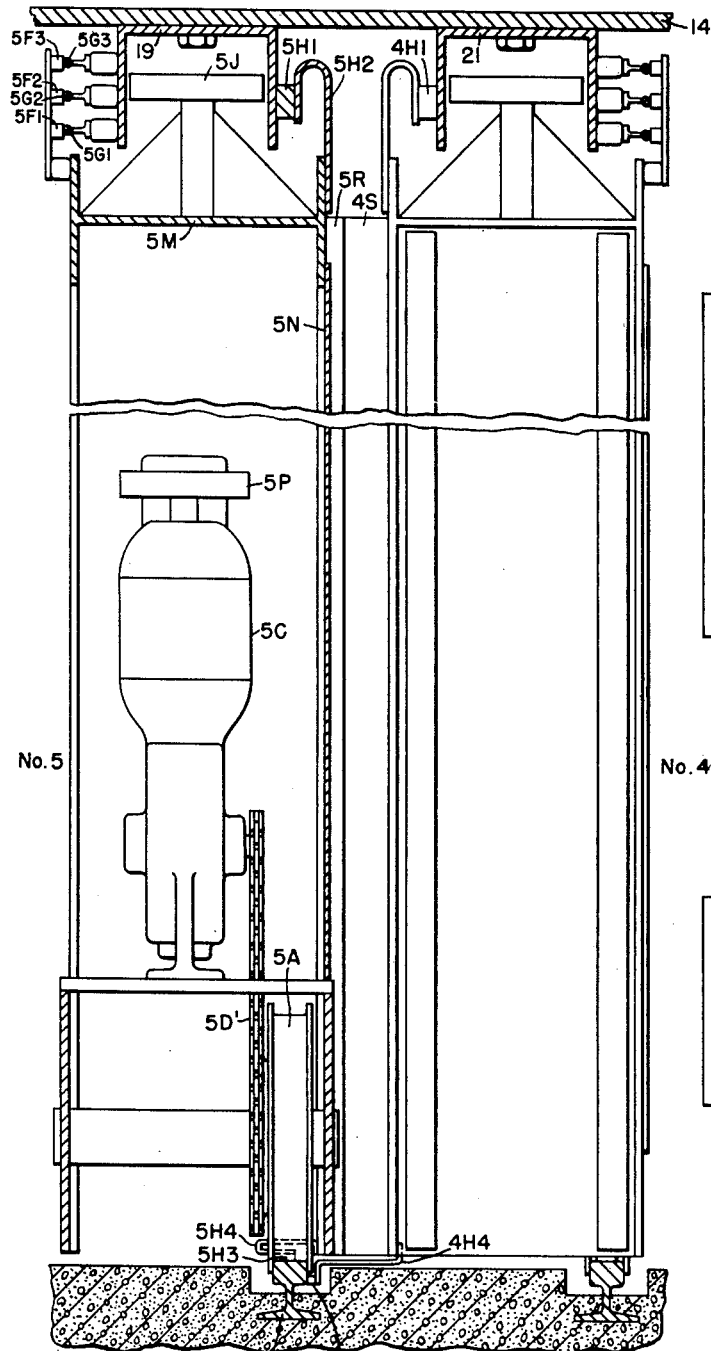
Figure 3 is a view in section, with parts broken away, taken on the line III—III of Figure 1.

Further details of door construction are illustrated in Figure 3. Each of the door units may be provided with a framework constructed of structural members such as the I beam 5M. The structural members may, for example, be constructed of materials such as steel or aluminum. The exposed surfaces of the doors may have the areas between the structural members closed by suitable panels 5N. It will be noted that the brushes 5F1, 5F2 and 5F3 engage, respectively, trolley conductors 5G1, 5G2 and 5G3. These trolley conductors are secured in any suitable manner to the building structure and are insulated from each other.

The wind reaction rollers 5J associated with the upper edge of the door unit No. 5 are received between the flanges of a channel 19, which is secured to the roof 14 and which extends for the full length of the door opening. The channel also may serve as a support for the trolley conductors.

The space between the door unit No. 5 and the channel 19 is substantially closed by means of a continuous strip 5H1 of suitable material, such as graphite. This strip is biased against a flange of the channel 19 by means of a continuous resilient strip 5H2 which has one edge secured to the I beam 5M. It will be understood that the graphite strip and the resilient strip 5H2 extend for the full width of the door unit and substantially seal the space between the door unit and the roof without interfering with reciprocation of the door unit. In a similar manner, a strip of graphite 5H3 is biased into engagement with the upper surface of the rail 18 by means of a resilient strip 5H4. This construction substantially closes the opening between the door unit and the rail 18.

It is believed that the construction of the door unit No. 4 and other door units will be understood from the discussion of the door unit No. 5. In many cases corresponding units associated with the doors are identified by the same reference characters, except for the prefix which corresponds to the numer of the door unit. Thus, the graphite strip 5H1 for the door unit No. 5 corresponds to the graphite strip 4H1 for the door unit No. 4. The graphite strip 4H1 cooperates with a flange of a channel 21 which is similar in construction to the channel 19. The strips 5H1 and 4H1 operate on adjacent flanges of the two channels.

The lower seal for the second row of door units also operates on the track or rail 18. For example, the graphite strip 4H3, which corresponds to the graphite strip 5H3, is biased against one side of the rail 18 by a resilient strip 4H4 which corresponds to the strip 5H4 on door unit No. 5. By placing the seals for the door units as close together as possible, the open space between the sealing strips of adjacent doors is minimized.

As previously explained, the engine provided for each of the door units may be in the form of an electric motor which will be assumed to be a direct-current reversible motor. However, an alternating current motor is entirely suitable. Preferably, each engine has associated therewith a brake 5P which may be of the spring-applied, electrically-released type. Such brakes are well known in the motor control art. Each door unit may have a manually operable controller mounted directly thereon for controlling the movement and direction of the associated engine. However, it is assumed that remote control stations are provided.

Figure 4:
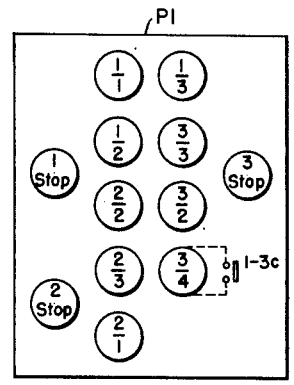
Figures 4 and 5 are views in elevation of control stations suitable for controlling the door units of Figure 1.
Figure 5:
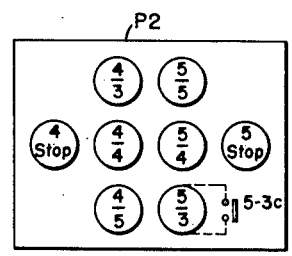

As shown in Figure 4, the control station P1 has a number of push button switches for controlling the operation of the door units Nos. 1, 2, and 3. Three buttons labeled "1 stop," "2 stop" and "3 stop" may be operated at any time for the purpose of stopping, respectively, door units Nos. 1, 2, and 3. The remaining push buttons have notations representative of the specific door unit and the specific position to which the door unit is to be moved. This notation employs a fraction wherein the numerator indicates the number of the door unit to be moved and the denominator indicates the position to which the door unit is to be moved. For example, the fraction ⅓ indicates that when the push button is operated, the door unit No. 1 will move adjacent the position normally closed by the door unit No. 3.

A circuit will be described below which may be operated to move the door unit No. 1 to the position normally occupied by the door unit No. 3. To permit such movement, the door unit No. 3 must be moved adjacent the position normally occupied by the door unit No. 4. To facilitate such movement, the contacts of the push-button switch ¾ are shunted by contacts 1—3c which are closed when the door unit No. 1 is to be moved adjacent the position normally occupied by the door unit No. 3.

The control station P2 is employed in an analogous manner for the purpose of controlling movement of the door units Nos. 4 and 5. Since the same system of notattions is employed, it is believed that the function of the various push-button switches will be understood without further discussion.

Figures 6 and 7 illustrate components of the object-detecting means. Each of the door units has at each end a vertical retracting shaft which is mounted for rotation relative to the associated door unit about a vertical axis. Thus, at one end, the door unit No. 4 has a vertical shaft 4Q which is employed for retracting and advancing sections of the object-detecting means 4K. Three of the sections 4K1, 4K2, and 4K3 are illustrated in Figure 6. Each of the sections is linked by a pair of spaced parallel links 23 to the associated door unit. It will be noted that each of the links is pivoted at each end, respectively, to the associated section and to the associated door unit. The links are so positioned that the sections tend to fall by gravity down and outwardly from the associated door unit. The relationship of the sections and the links is clear from a study of Figure 6.

An intermediate point on each of the links is connected by means of a chain 24 to an arm 25 mounted on the retracting shaft 4Q. By inspection of Figure 7, it will be observed that when the shaft 4Q is rotated in a counterclockwise direction, the section 4K2 is released and falls under the influence of gravity to the positions shown in broken lines. If the shaft thereafter is rotated in a clockwise direction, the section is returned to its retracted position.

Since the chains 24 are flexible, each of the sections may be moved independently from its advanced position towards its associated door unit. Such movement of each section is employed for operating a separate switch 26. To this end, each section has a cam 27 positioned to engage an operating member of the switch 26 when the section is moved by an object towards its associated door unit. When the sections are retracted, the switches 26 are left in their closed conditions. For this purpose, the switches 26 may be mounted on the shaft 4Q for movement away from the cams 27 when the shaft 4Q is rotated in retracting direction.

Retracting movement of the shaft 4Q may be effected by a retracting motor 4MW which is coupled to a drum 4MW1 through suitable gearing. Although an alternating current motor may be employed, it will be assumed that the motor 4MW is a reversible direct current motor. The drum has secured thereto one end of a chain 4MW2. The remaining end of the chain 4MW2 is connected to an arm 4MW3 which is secured to the shaft 4Q. Upon energization in one direction, the motor 4MW drives a drum 4MW1 in a counterclockwise direction to retract the associated sections of the object-detecting means. Upon reverse rotation of the electric motor, the sections are allowed to move under the influence of gravity to their advanced positions. A spring-applied, electrically-released brake 4MW4 is associated with the motor for retaining the motor in any desired position. Limit switches of any conventional type are provided for terminating the energization of the motor following a sufficient rotation of the motor in either direction. A limit switch 4SW is represented in Fig. 6 and may have an operating arm 61 positioned adjacent a face of the drum 4MW1. The drum has two operating pins 62 and 63 secured thereto at points arcuately spaced about the axis of the drum for operating the arm 61. The arm 61 is positioned between the pins. As the drum approaches its limit of travel in either direction one of the pins engage the arm 61 to actuate the limit switch 4SW in the proper direction. It will be understood that the object-detecting means for each end of each of the door units operates in a similar manner.

As shown in Figure 7, each section of the object-detecting means may be constructed of hollow, metallic members, as 4K2a and 4K2b, having a rectangular outline. Each member may have a soft resilient striking edge (as 4K2c and 4K2d) secured thereto.

When the door units are in closed positions, it is desirable to substantially close the space between adjacent door units. To this end, suitable sealing means may be provided between overlapping ends of the door units. Thus, in Fig. 7 the door unit No. 5 has a vertical cam 5R which extends substantially for the full height of the door unit. When the door units are in closed position, the cam 5R engages the edges of a resilient tongue 4S, which conveniently may be constructed of rubber. The tongue 4S extends for the full height of the door unit No. 4. These elements provide an effective seal and also have sufficient clearance to permit desired movements of the door units. It will be noted that the trailing and leading edges of the cam 5R are tapered to facilitate movement of the tongue 4S thereover. A similar sealing unit is provided for each pair of ends of the door units which overlap when the door units are in closed position.

It will be recalled that each of the door units is associated with a separate set of trolley conductors. These trolley conductors for each door unit have lengths sufficient to permit the desired movement of the door unit. Should the door unit be moved beyond this desired range, the trolley brushes would leave the trolley conductors to deenergize the associated traction motor and bring the door unit to a stop. The trolley conductors and brushes for the various door units preferably are staggered to prevent the brushes associated with one of the door units from engaging the trolley conductors associated with another of the door units. A suitable association of the door units, the trolley brushes, and the trolley conductors is shown in Figure 8. It will be noted that the trolley conductors and brushes for the door units Nos. 2 and 4 are located on a side of the door units opposite that on which the remaining brushes and trolley conductors are located.

Each of the door units has associated therewith a number of limit switches and a direction switch, which are employed in controlling the movement of the door unit. The relationship between these switches and the door units is clearly apparent from Figure 8. Each of the door units has a cam for operating a row of switches. Thus, the door unit No. 1 has a cam 1CA which operates four limit switches. These limit switches have normally closed contacts, and the contacts for each switch are opened when the cam 1CA is adjacent the operating member of the switch. The identification of each of the switches indicates its purpose. Thus, when the door unit No. 1 approaches its normally closed position while traveling east, the cam 1CA finally engages the limit switch 1—1E to bring the door unit to a stop accurately in the desired position. If the door unit No. 1 is traveling west for the purpose of placing it adjacent the position normally closed by the door unit No. 2, the cam 1CA finally engages the operating member of the switch 1—2W to bring the door unit to a stop in the desired position. If the door unit No. 1 is to be moved to the position normally occupied by the door unit No. 3, the cam 1CA finally engages the limit switch 1—3W to bring the door unit to a stop in the desired position. The first numeral in the designation of each of the switches indicates the door unit with which it is associated. The second numeral in the designation indicates the position adjacent which the door unit is to be moved, and the letter indicates the direction of movement of the door unit to reach the desired position.

The direction switch is employed for indicating the direction in which a door unit is to be moved to a predetermined position. For example, the door unit No. 1 may be moved adjacent a position normally closed by the door unit No. 2 in an eastward or in a westward direction of travel. The direction is determined in part by a direction switch having two sets of contacts 1S1 and 1S2. When the cam 1CA is to the right of the direction switch, as viewed in Figure 8, the contacts 1S1 are open, whereas the contacts 1S2 are closed. When the cam 1CA is to the left of the direction switch, the contacts 1S1 are closed, whereas the contacts 1S2 are open. Direction switches of this type are known in the art. It is believed that the operation of the remaining switches in Figure 8 will be understood by inspection of the figure. It will be understood that each of the cams and the switches associated therewith are so positioned that the cam for each door unit operates only the switches associated with such door unit. It will be understood further that each of the switches operated by each of the cams may have one or more sets of contacts operated by the cam to open or closed condition as required.

Figure 9:
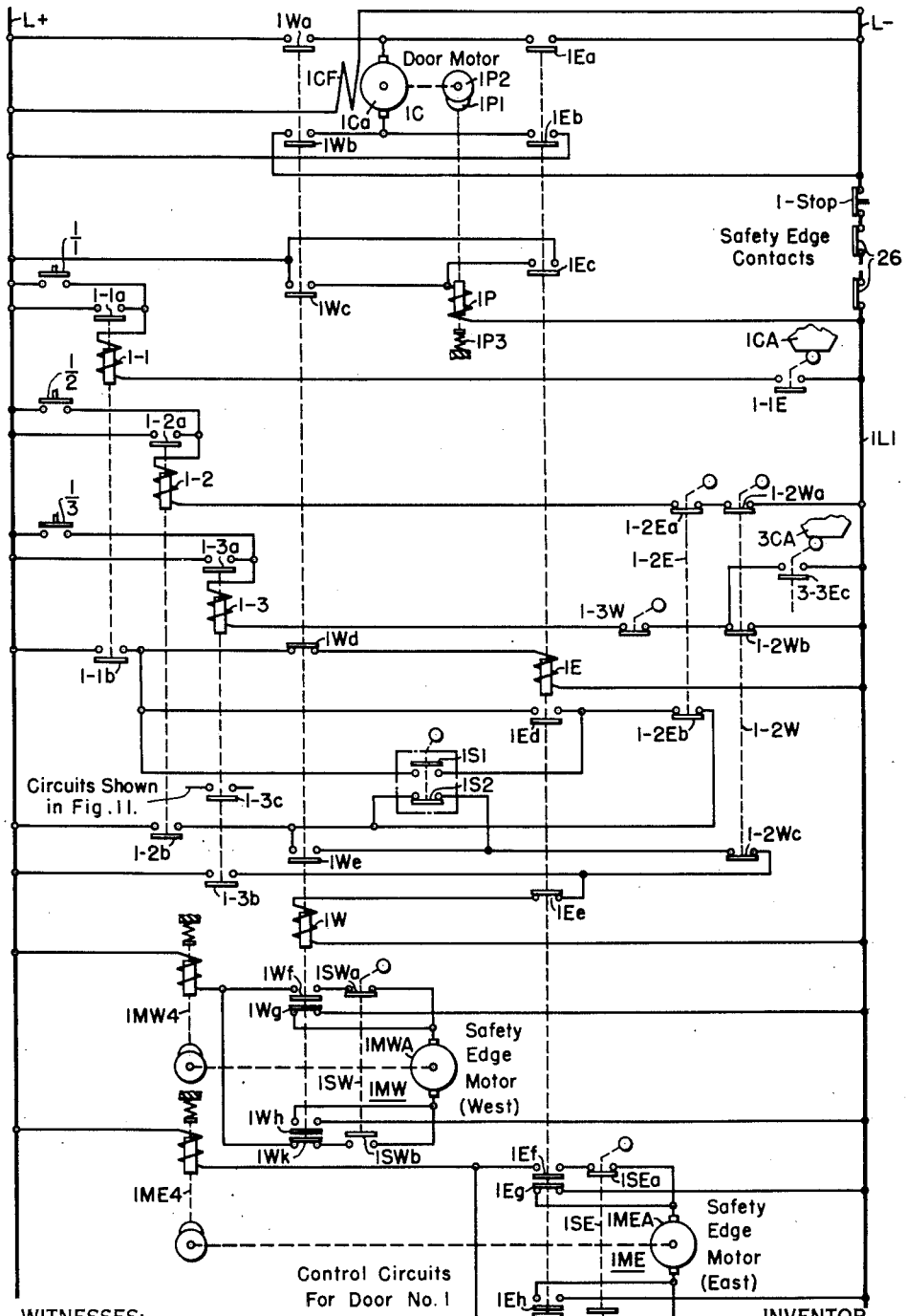
Figure 9 is a schematic view showing control circuits suitable for controlling one of the door units of Figure 1.
Figure 10:
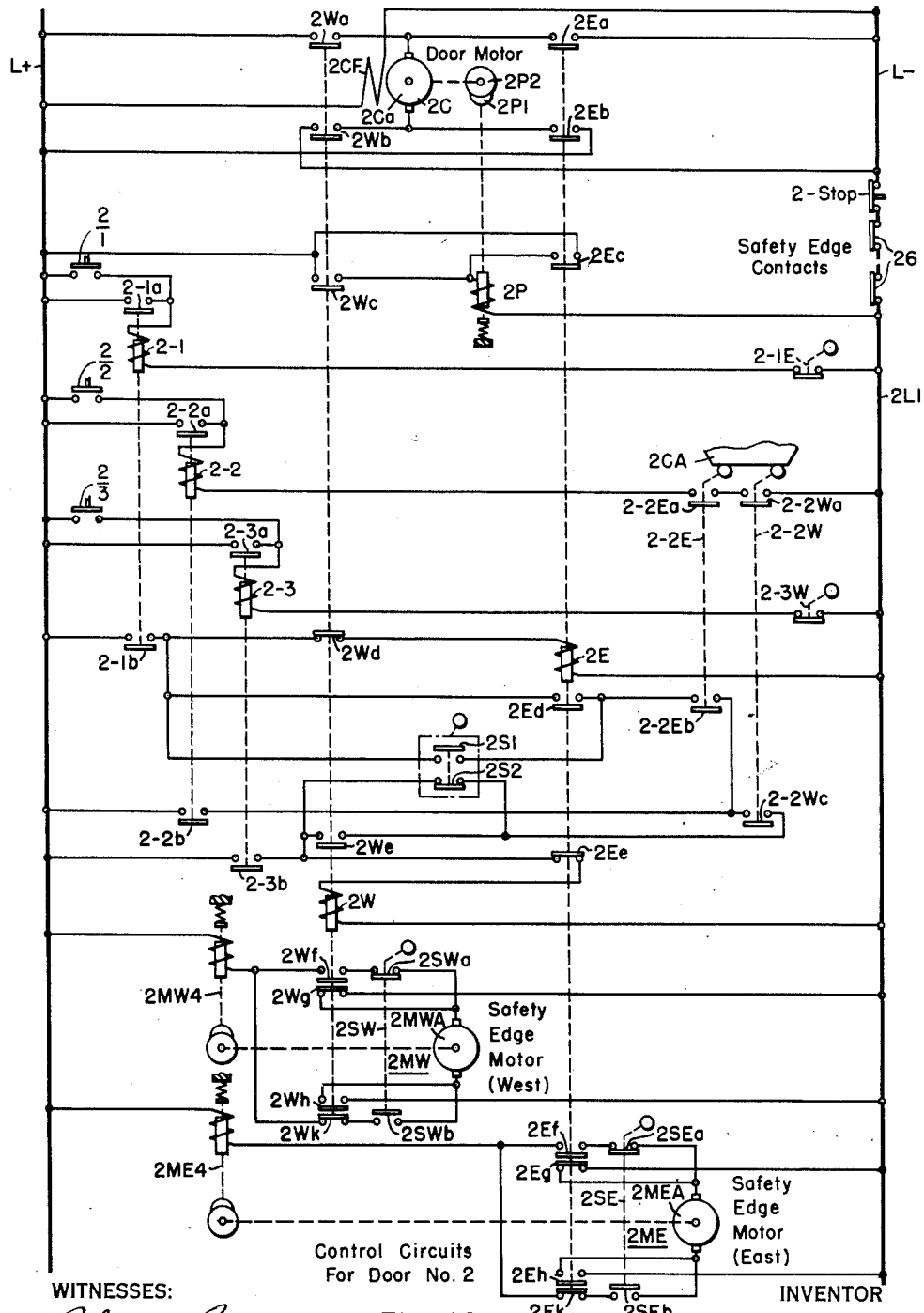
Figure 10 is a schematic view showing control circuits suitable for controlling the operation of a second door unit employed in the embodiment of Figure 1.

Figure 9 illustrates control circuits for the door unit No. 1. These circuits are energized from a source of direct current represented by buses L+ and L—. In Figure 9, a number of electromagnetic relays are illustrated. These include the following:

1W—west-direction relay,
1E—east-direction relay,
1—1—first-position relay,
1—2—second-position relay,
1—3—third-position relay.

Each of the relays may have a plurality of sets of contacts, and each of the sets of contacts will be separately identified by a lower case subscript letter applied to the reference character employed for the associated relay. Thus, the reference characters 1—1a and 1—1b designate separate sets of contacts associated with the first-position relay 1—1.

It is believed that the circuits of Figure 9 can be understood best by consideration of some typical operations of the door unit No. 1. It will be assumed, first, that the door unit No. 1 is to be moved from its normally closed position to a position alongside the door unit No. 2 for the purpose of providing an opening in the area normally closed by the door unit No. 1. In order to move the door unit No. 1 alongside the door unit No. 2, the push button ½ is pressed. It will be recalled that this push button is located on the control station P1 (Figures 1 and 4).

In Figure 9, the bus L— is connected to an auxiliary bus 1L1 through the stop push button for the door unit No. 1 and through the switches 26 associated with the object-detecting means for the door unit No. 1. Only two of the switches are illustrated in Figure 9.

Inasmuch as the door unit No. 1 is assumed to be initially in its normally closed position, the normally closed contacts of the switches 1—1E and 1—2W are closed. Consequently, operation of the push button ½ completes the following circuit:

L+, ½, 1—2, 1—2Ea, 1—2Wa, 1L1

In response to its energization, the second position relay 1—2 picks up to close its make contacts 1—2a for the purpose of establishing a holding circuit around the push button ½. In addition, the make contacts 1—2b close to complete the following circuit:

L+, 1—2b, 1S2, 1—2Wc, 1Ee, 1W, 1L1

In this circuit the direction switch contacts 1S2 are closed for the reason that the door unit No. 1 is east of this switch.

Upon being energized, the west-direction relay 1W picks up to close its make contacts 1Wa, 1Wb, 1Wc, 1We, 1Wf, and 1Wh and to open its break contacts 1Wd, 1Wg and 1Wk. The contacts 1Wa and 1Wb form part of a reversing switch for the armature 1Ca of the direct-current door traction motor 1C. This motor has a field winding 1CF permanently connected across the buses L+ and L—. The closure of the contacts 1Wa and 1Wb establishes the following energizing circuit:

L+, 1Wa, 1Ca, 1Wb, L—

This energizes the traction motor 1C with proper polarity for travel of the door unit in the west direction.

Closure of the make contact 1Wc connects the release coil of the brake 1P for energization across the buses L+ and 1L1. The brake 1P may include a brake shoe 1P1 which is urged against a brake drum 1P2 mounted on the armature shaft of the motor 1C for rotation therewith. The brake shoe normally is pressed against the drum 1P2 by means of a spring 1P3. Energization of the release coil results in retraction of the brake shoe against the bias of the spring 1P3 for the purpose of releasing the brake. Such brake mechanisms are well understood in the art. The door unit No. 1 now starts to move in the west direction.

Returning to the west-direction relay, it will be noted further that opening of the break contacts 1Wd prevents energization therethrough of the east-direction relay 1E. Closure of the make contacts 1We establishes a holding circuit around the contacts 1S2 of the direction switch.

The make contacts 1Wf and 1Wh of the west-direction relay form parts of a reversing switch for the armature 1MWA of the motor employed for advancing and retracting the object-detecting means located on the west end of the door unit No. 1. This motor may have a permanently excited field and may conveniently be of the permanent magnet field type. The same contacts also control the energization of the spring-applied, electrically-released brake 1MW4 associated with the motor 1MW. This brake may be similar in construction to the brake 1P. The resulting energizing circuit may be traced as follows:

L+, 1MW4, 1Wf, 1SWa, 1MWA, 1Wh, 1L1

The energization of the motor 1MW is in proper polarity to advance the associated object-detecting means into effective position. The rotation of the motor continues until a limit switch 1SW operates to open its contacts 1SWa and close its contacts 1SWb. Such operation of the limit switch occurs when the object-detecting means reaches its fully advanced position. Limit switches of this type for limiting the rotation of a motor are well known in the art.

In response to opening of the contacts 1SWa, the armature 1MWA is deenergized and the brake 1MW4 is re-applied to prevent further rotation of the motor 1MW. Opening of the break contacts 1Wg and 1Wk has no immediate effect on the operation of the system.

Referring to Figure 8, it will be noted that as the door unit No. 1 leaves its normally closed position the cam 1CA releases the limit switch 1—1E to permit reclosure of the switch contacts. Such reclosure has no immediate effect on the operation of the system. As the door unit reaches a position alongside the door unit No. 2, the cam 1CA engages the operating arm for the limit switch 1—2W to open the normally closed contacts thereof.

By reference to Figure 9, it will be observed that the opening of the contacts 1—2Wb has no immediate effect on the operation of the system. However, the opening of the contacts 1—2Wa deenergizes the position relay 1—2. This relay opens its holding contacts 1—2a and opens its make contacts 1—2b to deenergize the west-direction relay 1W. Opening of the contacts 1—2Wc also prevents energization therethrough of the west-direction relay.

In dropping out, the west-direction relay opens its make contacts 1Wa and 1Wb to deenergize the armature of the motor 1C. Also, contacts 1Wc open to deenergize the release coil of the brake 1P, and the brake is promptly applied to stop the door unit No. 1 in the desired position alongside the door unit No. 2. Closure of the break contacts 1Wd and opening of the make contacts 1We, 1Wf, and 1Wh have no immediate effect on the operation of the system.

Closure of the break contacts 1Wg and 1Wk completes a circuit for retracting the object-detecting means located at the west end of the door unit No. 1. This circuit may be traced as follows:

L+, 1MW4, 1Wk, 1SWb, 1MWA, 1Wg, 1L1

The brake 1MW4 now is released, and the motor 1MW is energized with proper polarity to retract the object-detecting means. When the motor 1MW reaches its limit of travel in the retracting direction, the limit switch 1SW is operated thereby to close its contacts 1SWa and open the contacts 1SWb. The opening of the contact 1SWb deenergizes the motor 1MW and the brake 1MW4. Consequently, the motor is stopped with the object-detecting means in its retracted condition.

The door unit No. 1 now is alongside the door unit No. 2, and the area normally closed by the door unit No. 1 is open to permit objects to be moved therethrough into and out of the hangar. It should be noted that during the travel of the door unit No. 1 from its normally closed position to its open position, the door unit may be stopped at any time by operation of its stop button or by opening of any of the switches 26 associated with the object-detecting means mounted on the door unit. The opening of the normally closed stop push button or of the normally closed switches 26 disconnects the bus 1L1 from the bus L— and deenergizes the relays associated with the bus 1L1. The deenergization of the west-direction relay 1Wd promptly stops the door unit No. 1 in a manner which will be clear from the foregoing discussion.

It will be assumed next that the push button ⅓ is operated to return the door unit No. 1 to its normally closed position. Upon operation, the push button completes the following energizing circuit:

L+, ⅓, 1—1, 1—1E, 1L1

The first position relay 1—1 now is energized and closes its make contacts 1—1a to establish a holding circuit around the push button ⅓. In addition, the make contacts 1—1b close to establish the following circuit:

L+, 1—1b, 1Wd, 1E, 1L1

The east-direction relay 1E now is energized. The relay closes its make contacts 1Ea, 1Eb, 1Ec, 1Ed, 1Ef, 1Eh and opens its break contacts 1Ee, 1Eg and 1Ek.

Closure of the make contacts 1Ea and 1Eb completes an energizing circuit for the motor 1C with proper polarity for travel of the door unit No. 1 in the east direction. Since closure of the make contacts 1Ec releases the brake 1P, it follows that the door unit No. 1 is conditioned for travel in the east direction.

Closure of the contacts 1Ed and opening of the contacts 1Ee, 1Eg and 1Ek have no immediate effect on the operation of the system. However, closure of the make contacts 1Ef and 1Eh completes an energizing circuit for the motor 1ME to advance the object-detecting means located at the east end of the door unit No. 1. The energizing circuit may be traced as follows:

L+, 1ME4, 1Ef, 1SEa, 1MEA, 1Eh, 1L1

This energizing circuit energizes the armature 1MEA in proper direction to advance the associated object-detecting means and energizes the brake 1ME4 to release the brake. The brake 1ME4 is similar in construction to the brake 1P.

When the object-detecting means associated with the motor 1ME reaches its fully advanced position the limit switch 1SE is operated to open its contacts 1SEa and close its contacts 1SEb. Opening of the contacts 1SEa deenergizes the armature 1MEA and the brake 1ME4 to stop the motor and hold the motor in the position corresponding to fully advanced object-detecting means. Closure of the contacts 1SEb prepares the motor for a subsequent retracting operation.

Referring to Figure 8, it will be noted that as the door unit No. 1 advances east, it releases the limit switches 1—2E and 1—2W. These limit switches reclose their normally closed contacts without immediate effect on the operation of the system. As the door unit No. 1 reaches its normally closed position, its cam 1CA engages the limit relay 1—1E to open the normally closed contacts of this limit switch. Such opening deenergizes the first position relay 1—1 (Fig. 9).

Upon deenergization, the first position relay opens its contacts 1—1a without immediately affecting the operation of the system. However, opening of the contacts 1—1b deenergizes the east-direction relay 1E.

The east-direction relay now opens its make contacts 1Ea and 1Eb to deenergize the armature of the traction motor 1C. In addition, make contacts 1Ec open to deenergize the brake 1P, and the door unit No. 1 is stopped in its normally closed position.

Opening of the make contacts 1Ed, 1Ef and 1Eh and closure of the break contacts 1Ee have no immediate effect on the operation of the system. However, closure of the break contacts 1Eg and 1Ek completes the following circuit:

L+, 1ME4, 1Ek, 1SEb, 1MEA, 1Eg, 1L1

The brake 1ME4 now is energized and released, and the motor 1ME is energized with proper polarity to retract the object-detecting means located at the east end of the door unit. When the object-detecting means reaches its fully retracted position, the limit switch 1SE is operated to close its contacts 1SEa and open its contacts 1SEb. This results in deenergization of the brake 1ME4 and the motor 1ME to hold the motor in the position corresponding to fully retracted object-detecting means.

It should be noted that during the travel of the door unit No. 1 to its normally closed position, the door unit is stopped promptly at any time by operation of the associated stop button or by opening of any of the switches 26 associated with the object-detecting means mounted on the door unit. Such operation or opening results in disconnection of the bus 1L1 from the bus L— and deenergization of the east-direction relay 1E. Upon dropping out, the relay 1E brings the door unit to a stop in a manner which will be clear from the foregoing discussion.

It is believed that the operation of the door units Nos. 2, 3, 4 and 5 may be traced on the control circuits for these door units shown respectively in Figures 10, 11, 12 and 13. In Figures 9 to 13, a uniform reference character notation is employed. Corresponding components are designated by reference characters wherein the first numeral or prefix designates the specific door unit with which the component is associated. If a compound numeral is employed, the second numeral designates the position with which the component is associated. Thus, the reference character 1—3 designates a third position relay for the door unit No. 1, which is employed for the purpose of bringing the door unit to the position normally occupied by the door unit No. 3. As a further example, the relay 5—3 designates a relay for the door unit No. 5 which when energized moves the door unit No. 5 to the position normally occupied by the door unit No. 3. However, to make certain that the operation of the door units is fully understood, additional operations now will be described.

It will be assumed next that an opening is desired in the area normally closed by the door units No. 1 and No. 2. To provide such an opening, the door unit No. 3 is moved alongside the door unit No. 4, and the door units Nos. 1 and 2 are then moved adjacent the door units Nos. 3 and 4. Such movement of the door units is effected by operation of the push buttons ⅓ and ⅔. Referring to Figure 9, it will be observed that operation of the push button ⅓ completes the following circuit:

L+, ⅓, 1—3, 1—3W, 1—2Wb, 1L1

The third position relay 1—3 is now energized and closes its make contacts 1—3a to establish a holding circuit around the push button. The contacts 1—3c close and are employed for the purpose of moving the door unit No. 3 out of the path of travel of the door unit No. 1. The purpose of the contacts 1—3c will be understood by reference to Figure 11 wherein closure of these contacts establishes the following circuit:

L+, 1—3c, 3—4, 3—4W, 3L1

It will be understood that the bus 3L1 is connected to the bus L— through the stop push button for the door unit No. 3 and through the normally closed switches 26 of the object-detecting means mounted on the door unit No. 3. In a similar manner operation of a position relay for any of the door units may be employed for operating a position relay for another door unit which is to be moved simultaneously to a new position.

When energized, the position relay 3—4 closes its make contacts 3—4a to establish a holding circuit around the contacts 1—3c. In addition, contacts 3—4b close to complete the following energizing circuit:

L+, 3—4b, 3Ee, 3W, 3L1

The west-direction relay 3W associated with the door unit No. 3 now picks up to start the door unit in the west direction and to advance the object-detecting means located on the west end of the door unit No. 3 by a sequence of operations which will be clear from the preceding discussion of the operation of the corresponding relay 1W for the door unit No. 1.

Figure 11:
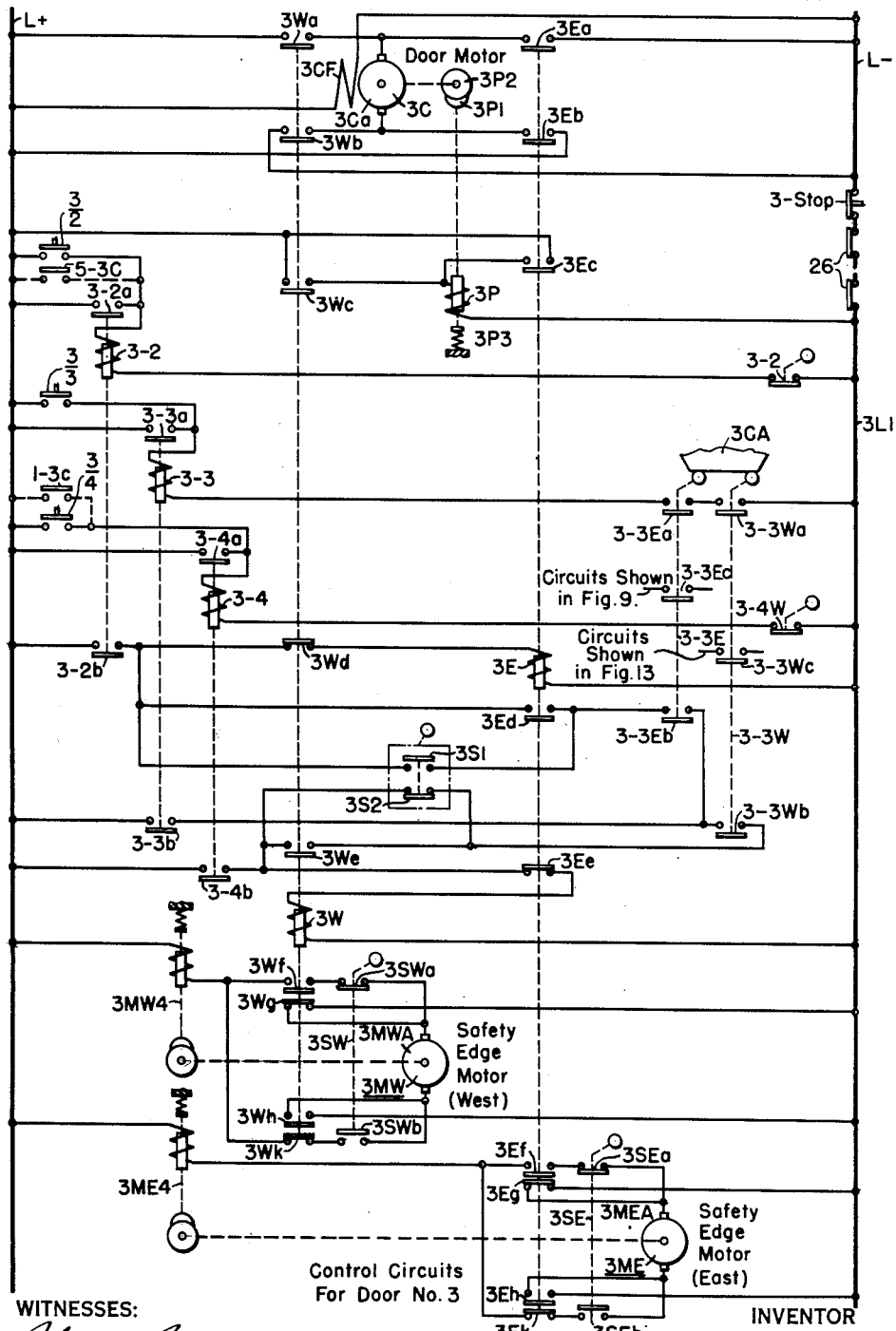
Figure 11 is a schematic view showing control circuits suitable for controlling the operation of a third door unit employed in the embodiment of Figure 1.
Figure 12:
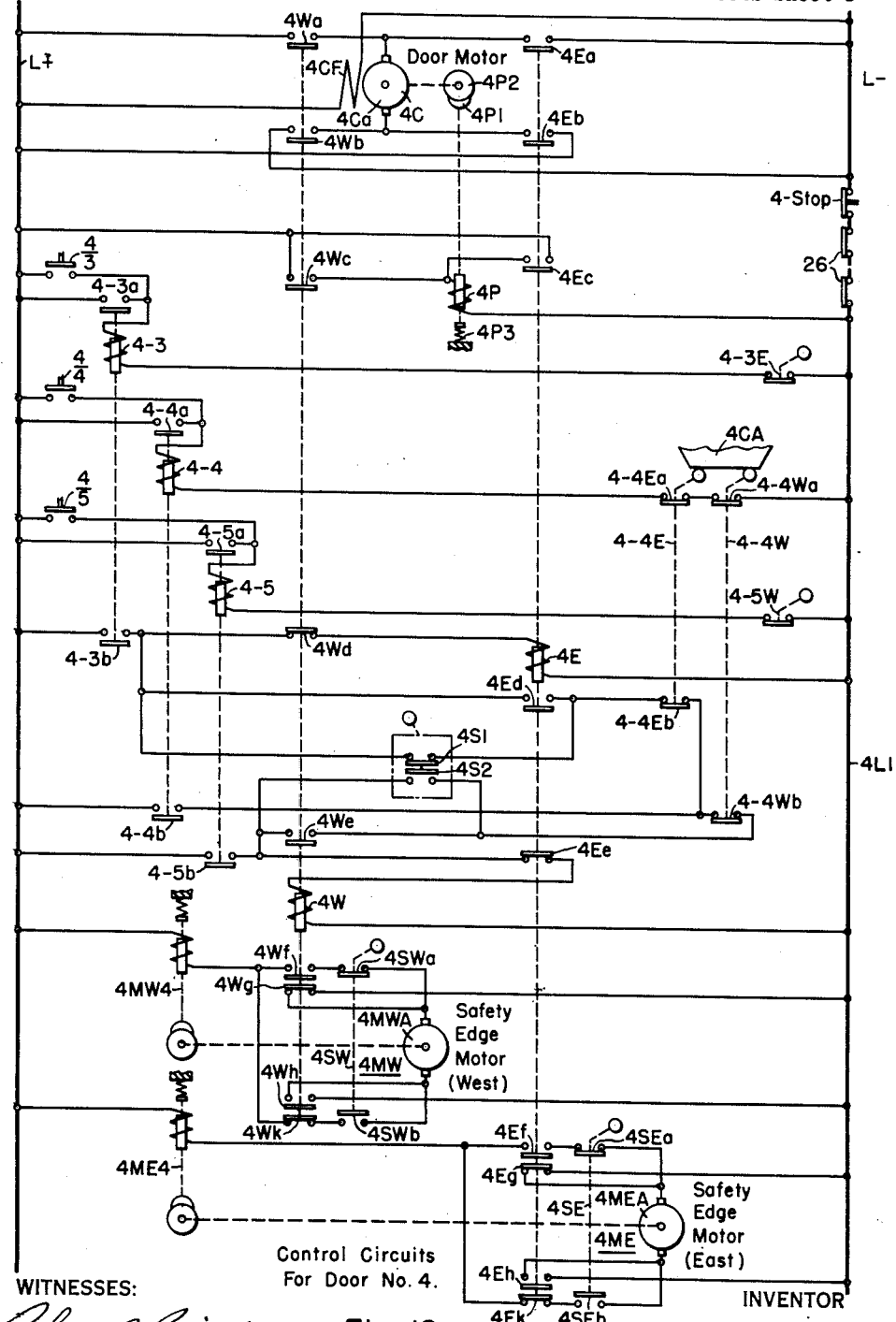
Figure 12 is a schematic view showing control circuits suitable for controlling the operation of a fourth door unit employed in the embodiment of Figure 1.
Figure 13:
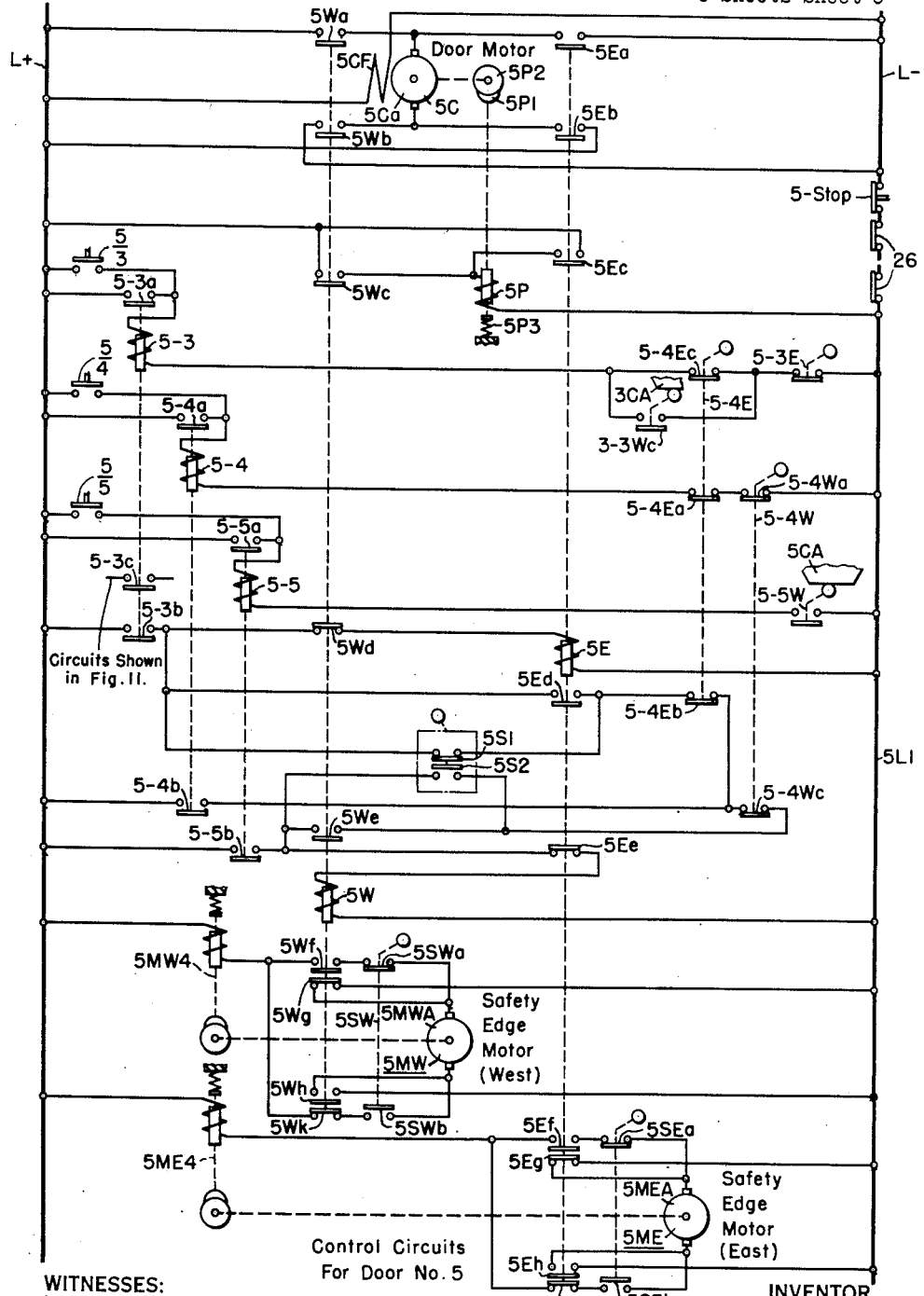
Figure 13 is a schematic view showing control circuits suitable for controlling the operation of a fifth door unit employed in the embodiment of Figure 1.

When the door unit No. 3 reaches a position substantially alongside the door unit No. 4, the limit switch 3—4W is opened by the cam 3CA (Figure 8) to interrupt the energizing circuit for the position relay 3—4 (Figure 11). The relay 3—4 opens its holding contacts 3—4a and opens its make contacts 3—4b to deenergize the west-direction relay 3W. The deenergization of the west-direction relay results in the stopping of the door unit No. 3 and the retraction of the object-detecting means located at the west end of the door unit by a sequence which will be clear from the preceding discussion of the corresponding operations for the door unit No. 1. The door unit No. 3 now is stopped alongside the door unit No. 4.

Referring again to Figure 9, it will be noted that the position relay 1—3 when energized also closed its make contacts 1—3b. Such closure completed the following circuit:

L+, 1—3b, 1Ee, 1W, 1L1

As a result of its energization, the west-direction relay 1W initiates movement of the door unit No. 1 in the west direction and advances the object-detecting means located at the west end of the door unit by the sequence previously described.

As the door unit No. 1 moves west, it reaches a position wherein its cam 1CA (Figure 8) operates the limit switch 1—2W. By reference to Figure 9, it will be noted that the contacts 1—2Wb of this limit switch control in part the energization of the position relay 1—3. If the door unit No. 3 were still in its normally closed position, the limit switch 3—3E would be open, and this together with the open contacts 1—2Wb would result in deenergization of the position relay 1—3. Consequently, the door unit No. 1 would come to rest before striking the door unit No. 3. (Contacts 3—Ec of the switch 3—3E are shown in both Figs. 9 and 11.)

Under the assumed conditions, the door unit No. 3 has been moved to the west, and the limit switch 3—3E is in closed condition. Consequently, this switch shunts the contacts 1—2Wb and maintains the energization of the position switch 1—3. The door unit No. 1 continues its westward movement and operates the limit switch 1—2E (Figure 8). The operation of the limit switch 1—2E has no immediate effect on the operation of the system. The continued movement of the door unit No. 1 next results in operation of the direction switch to close the contacts 1S1 and open the contacts 1S2 as long as the door unit No. 1 remains west of the direction switch. This operation of the direction switch assures motion of the door unit No. 1 in an eastward direction if the push button ½ thereafter is operated. The function of the direction switch may be understood more clearly by reference to Figure 9.

In Figure 9, the direction switch is shown in the condition it maintains as long as the door unit No. 1 is east of the direction switch. Under these circumstances, closure of the contacts 1—2b results in energization of the west-direction relay by the following circuit:

L+, 1—2b, 1S2, 1—2Wc, 1Ee, 1W, 1L1

Consequently, the door unit No. 1 must move to the west as a result of operation of the push button ½.

When the door unit No. 1 is west of the direction switch, the contacts 1S1 are closed and the contacts 1S2 are opened. Under these circumstances, closure of the contacts 1—2b energizes the east-direction relay through the circuit:

L+, 1—2b, 1—2Eb, 1S1, 1Wd, 1E, 1L1

Consequently, the door unit No. 1 must move east in response to operation of the push button ½.

Returning to the westward-moving door unit No. 1, this door unit finally reaches a position wherein its cam 1CA (Figure 8) operates the limit switch 1—3W. The opening of the limit switch 1—3W deenergizes the position relay 1—3 (Figure 9). Opening of the contacts 1—3a and 1—3c has no immediate effect on the operation of the system. However, opening of the contacts 1—3b results in deenergization of the west-direction relay 1W, and this relay operates in the manner previously described to bring the door unit No. 1 to a stop in the position normally closed by the door unit No. 3.

Referring next to the operation of the door unit No. 2 (Figure 10), the closure of the push button ⅔ energizes the position relay 2—3 by the circuit:

L+, ⅔, 2—3, 2—3W, 2L1

The position relay 2—3 closes its make contacts 2—3a to establish a holding circuit around the push button ⅔. In addition, the make contacts 2—3b close to establish the following energizing circuit for the west-direction relay:

L+, 2—3b, 2Ee, 2W, 2L1

Consequently, the west-direction relay operates to start the door unit No. 2 westward and to project the object-detecting means located at the west end of the door unit in a manner which will be clear from the preceding discussion of the operation of the corresponding west-direction relay 1W for the door unit No. 1.

As the door unit No. 2 leaves its normally closed position, its cam 2CA (Figure 8) operates the direction switch contacts 2S1 and 2S2. The purpose and operation of these contacts will be clear from the discussion of the operation of the corresponding contacts 1S1 and 1S2 for the door unit No. 1.

Finally, the door unit No. 2 operates the limit switch 2—3W. By reference to Figure 10, it will be noted that the opening of the limit switch 2—3W results in deenergization of the position relay 2—3. Opening of the make contacts 2—3a has no immediate effect on the operation of the system. However, opening of the make contacts 2—3b deenergizes the west-direction relay 2W. This relay initiates a stopping operation of the door unit No. 2 and a retracting operation for the object-detecting means located at the west end of the door unit No. 2 in a manner which will be clear from the preceding discussion of the operation of the corresponding west-direction relay 1W for the door unit No. 1.

The door area normally closed by the door units No. 1 and No. 2 now is open for movement therethrough of objects into or out of the hangar.

If the door units are to be returned to their normally closed positions, the push button switch ¼ (Figure 9) may be pressed. This results in return of the door unit No. 1 to its normally closed position by a sequence which will be clear from the preceding discussion. During the return of the door unit, the switch contacts 1S1 and 1S2 (Figure 8) are operated to the conditions corresponding to location of the door unit No. 1 east of the direction switch.

In addition, the push-button switch ⅔ (Figure 10) may be pressed for the purpose of returning the door unit No. 2 to its normally closed position. From a consideration of Figure 10, it will be clear that the pressing of the push button ⅔ results in energization of the position relay 2—2 and energization of the east-direction relay 2E. The relay 2E starts the door unit No. 2 eastward and advances the object-detecting means at the east end of the door unit in a manner which will be clear from the preceding discussion of the operation of corresponding components associated with the door unit No. 1. During its movement the door unit No. 2 operates the contacts 2S1 and 2S2 of the limit switch to the positions shown in Figure 10. As the door unit No. 2 reaches its desired position, the limit switch 2—2E opens to deenergize the position relay 2—2. This results in deenergization of the east-direction relay 2E and stopping of the door unit No. 2 by a sequence which will be clear from the preceding discussion.

Finally, the push button ⅗ (Figure 11) may be pressed to return the door unit No. 3 to its normally closed position. The actuation of the push button ⅗ results in energization of the position relay 3—3 and energization of the east-direction relay 3E for the purpose of moving the door unit No. 3 in an eastward direction. During the course of its movement, the door unit No. 3 returns the contacts 3S1 and 3S2 of the direction switch to the positions illustrated in Figure 11. As the door unit reaches its normally closed position, it operates the limit switch 3—3E to deenergize the position relay 3—3. The resultant deenergization of the east-direction relay 3E results in the stopping of the door unit No. 3 in a manner which will be clear from the preceding discussion of the corresponding stopping of the door unit No. 1.

In this way, the various push buttons may be operated to provide a door opening equal to the width of one door unit or to the width of two adjacent door units at various positions along the door opening. By provision of suitable circuits for energizing position relays for more than one door unit in response to operation of a single push button, various combinations of door units may be moved simultaneously as desired. It will be understood from the foregoing discussion that the push button operated circuits cooperate with motion stopping limit switches to provide various combinations of multiple door movements.

Although the invention has been described with reference to certain specific embodiments thereof, numerous modifications embodying the invention are possible. For this reason, the specific embodiments herein illustrated or described are to be construed in an illustrative rather than in a limiting sense.

I claim as my invention:

1. In an enclosure, a structure having a door opening, a plurality of door units, and means positioning the door units successively across said opening to close the opening, said positioning means permitting movement of the door units independently of each other substantially within and parallel to the opening to expose selected portions of the opening, one of the door units having object-detector means for stopping the associated door unit, said object-detector means including a plurality of object detectors successively located along one end of the door unit, each of the object detectors being independently responsive to the presence of an object in the path of movement of the associated door unit to initiate a stopping operation of the door unit, means mounting the object detectors for movement relative to the door unit from retracted to projected positions, and means for projecting the object detectors from the remainder of the associated door unit during door travel and for retracting the object detectors when the associated door unit is in a predetermined condition.

2. In an enclosure, a structure having a door opening, a plurality of rows each containing a plurality of door units extending across the door opening, means mounting each of the door units for movement along its associated row, said rows being parallel and adjacent each other but being spaced sufficiently to permit movement of a door unit of one of said rows alongside a door unit of another of said rows, the door units in each of said rows being insufficient in over-all width to close said door opening by at least a predetermined row opening, the number of said rows of door units being sufficient to permit movement of the door units to positions substantially closing the door opening, separate motive means for moving each of the door units along its row, and control means operable for conditioning the motive means to expose a portion of the opening normally closed by any of said door units, the control means being operable for moving one of the door units in each of two directions, the control means including direction means responsive to the direction of displacement of said last-named one of the door units from a predetermined position in each of two directions for setting an associated one of the door units for travel respectively in first and second directions.

3. In an enclosure, a structure having a door opening, a plurality of rows each containing a plurality of door units extending across the door opening, means mounting each of the door units for movement along its associated row, said rows being parallel and adjacent each other but being spaced sufficiently to permit movement of a door unit of one of said rows alongside a door unit of another of said rows, the door units in each of said rows being insufficient in over-all width to close said door opening by at least a predetermined row opening, the number of said rows of door units being sufficient to permit movement of the door units to positions substantially closing the door opening, separate electromotive means mounted on each of the door units for moving the associated door unit relative to the structure over a range less than the corresponding dimension of the door opening, and separate trolley and trolley pickup means for transmitting electrical energy from the structure to each of the door units, the trolley and trolley pickup means for one of the door units becoming ineffective for transmitting electrical energy to the associated electromotive means in response to movement of the last-named door unit outside said range for the last-named door unit.

4. A door unit comprising a door, a plurality of object-detecting means disposed successively along one end of the door, each of said object-detecting means being independently effective for detecting the presence of an object in the path of travel thereof, common retracting means and means coupling the common retracting means to the plurality of object-detecting means for moving the object-detecting means from operating to non-operating positions.

5. In an enclosure, a structure having a door opening, a plurality of rows each containing a plurality of door units extending across the door opening, means mounting each of the door units for movement along its associated row, said rows being parallel and adjacent each other but being spaced sufficiently to permit movement of a door unit of one of said rows alongside a door unit of another of said rows, the door units in each of said rows being insufficient in over-all width to close said door opening by at least a predetermined row opening, the number of said rows of door units being sufficient to permit movement of the door units to positions substantially closing the door opening, said door units being movable to positions within the door opening for aligning the row openings at various positions in the door opening, separate electromotive means mounted on each of the door units for moving the associated door unit in either direction along the rows, separate spring-applied, electrically-released brake means for stopping each of the door units in any desired position, separate object-detecting means for each end of each of the door units for detecting the presence of an object in the path of movement of the associated door unit, separate trolley and trolley pickup means for each of the door units for transmitting electrical energy from the structure to operate the electromotive means and brake means of the associated door unit over a range of movement of the door unit less than the corresponding dimension of the door opening, each of said trolley and trolley pickup means interrupting said transmission of electrical energy in response to movement of the associated door unit outside its said range of movement, and control means operable remote from the door units for moving the door units to predetermined positions to locate said predetermined row openings at various positions of the door opening, said control means being operable to return the door units to their normally-closed positions, and means responsive to operation of one of the object-detecting means by an object in the path of movement of the associated door unit for deenergizing the electromotive means and brake means of such door unit.

6. An enclosure as claimed in claim 5 wherein the control means includes limit switches for determining various positions of one of the door units and direction switch means responsive to the direction of displacement of one of the door units from a predetermined position, and selecting means operable for selecting the direction switch means and the limit switches to be employed in controlling the energization of the electromotive means and the brake means of one of the door units.

7. An enclosure as claimed in claim 6 in combination with auxiliary means responsive to operation of the control means to move one of the door units in a predetermined direction for operating the object-detecting means for such door unit and such predetermined direction from an inoperative to an operative position, said auxiliary means being responsive to arrival of the last-named door unit at its destination for retracting the last-named object-detecting means to its inoperative position.

8. In an enclosure, a structure having a door opening, first and second rows each containing a plurality of door units extending across the door opening, said structure having a track for each of the rows, means mounting each of the door units for movement along its associated row, each of the door units having a traction wheel engaging the associated track, means including an engine mounted on each of the door units for rotating the associated traction wheel, said rows being parallel and adjacent each other but being spaced sufficiently to permit movement of a door unit of one of said rows alongside a door unit of another of said rows, the door units in each of said rows being insufficient in over-all width to close said door opening by at least a predetermined row opening, the number of door units in said first and second rows being sufficient to permit movement of the door units to positions providing end door units and intermediate door units substantially closing the door opening, each of said intermediate door units when in closed position being independently movable in two directions parallel to said rows by the associated engine and traction wheel over a substantial range of movement in said door opening for the purpose of exposing various parts of the door opening.

References Cited in the file of this patent
UNITED STATES PATENTS

| | | |
|---|---|---|
| 562,141 | McElroy | June 16, 1896 |
| 913,773 | Rowntree | Mar. 2, 1909 |
| 1,944,157 | Forman | Jan. 23, 1934 |
| 2,021,290 | Chambers | Nov. 19, 1935 |
| 2,192,063 | Hopkins | Feb. 27, 1940 |
| 2,523,645 | Bruestle | Sept. 26, 1950 |
| 2,599,747 | Craigon | June 10, 1952 |